United States Patent [19]
Tempka et al.

[11] 3,798,555
[45] Mar. 19, 1974

[54] PULSE RECOVERY SYSTEM

[75] Inventors: John A. Tempka, Glenview; Elwood C. Reichart, Chicago, both of Ill.

[73] Assignee: Motorola, Inc., Franklin Park, Ill.

[22] Filed: Nov. 16, 1972

[21] Appl. No.: 307,257

[52] U.S. Cl. ............... 328/74, 328/63, 328/134, 328/140, 328/146, 328/155, 328/127
[51] Int. Cl. ............................................ H03k 3/64
[58] Field of Search ............ 328/133, 134, 146, 147, 328/63, 74, 72, 140, 155

[56] References Cited
UNITED STATES PATENTS

| | | | |
|---|---|---|---|
| 2,980,858 | 4/1961 | Grondin et al. | 328/134 X |
| 3,278,770 | 10/1966 | Shoh | 328/147 X |
| 3,515,997 | 6/1970 | Babany | 328/134 |
| 3,671,776 | 6/1972 | Houston | 328/133 X |
| 3,714,463 | 1/1973 | Laune | 328/134 X |
| 3,714,589 | 1/1973 | Lewis | 328/155 |
| 3,717,818 | 2/1973 | Herbst | 328/134 X |
| 3,736,516 | 5/1973 | Ellis | 328/155 X |

*Primary Examiner*—John S. Heyman
*Attorney, Agent, or Firm*—Eugene A. Parsons; Vincent J. Rauner

[57] ABSTRACT

Received pulses and recovered or internally produced pulses are applied to a coincidence gate the output of which is applied to an integrator. The output of the integrator, which gradually increases in amplitude during non-coincidence, is applied to a comparator that operates to produce an output signal when the output of the integrator reaches a predetermined amplitude. The output of the comparator is differentiated to produce pulses and applied to an OR gate along with internally generated clock pulses. The clock pulses with the interspersed additional pulses are applied to a counter that produces the recovered pulses.

5 Claims, 2 Drawing Figures

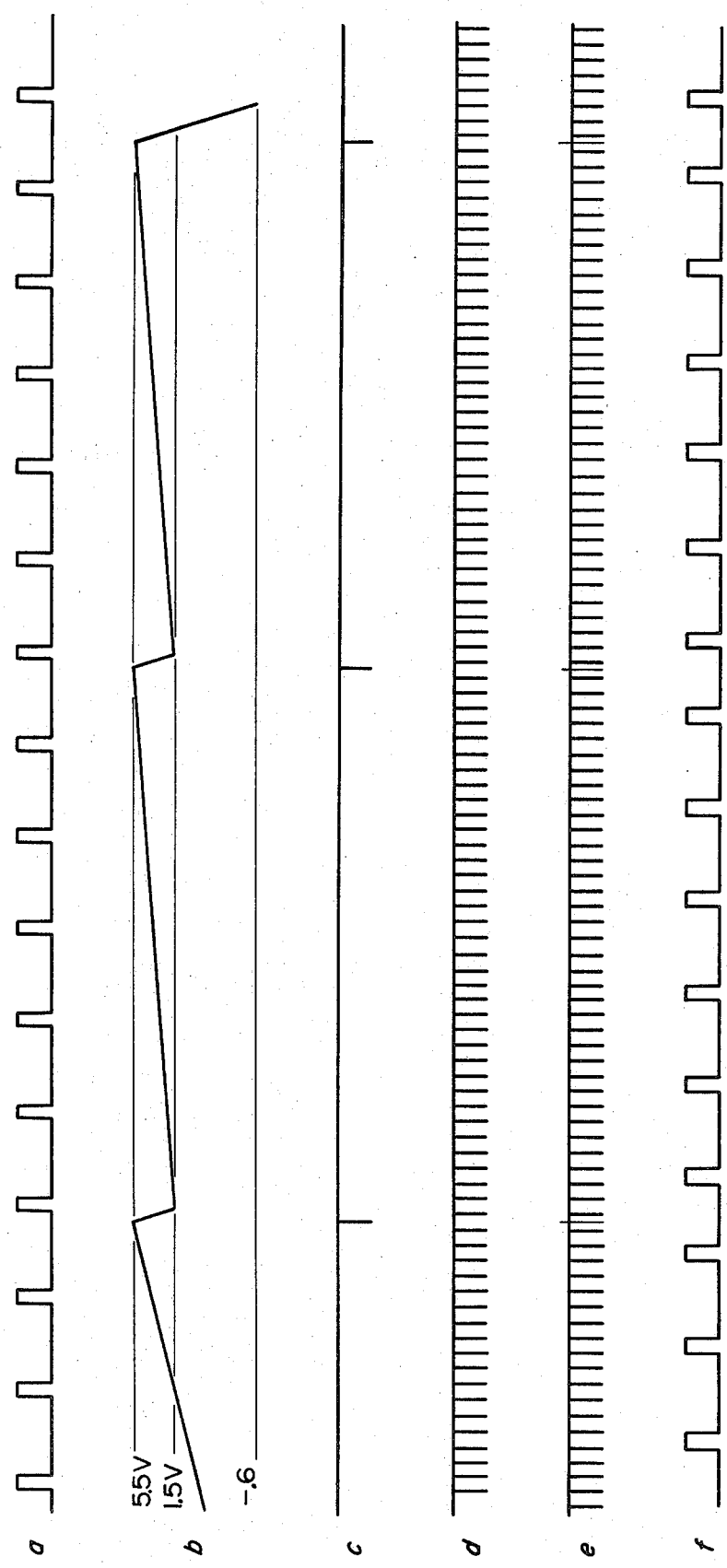

PULSE RECOVERY SYSTEM

BACKGROUND OF THE INVENTION

1. Field of the Invention

In communications and many other electronic fields, transmitted signals contain various types of timing pulses and, generally, correct operation of the receiver depends upon the phase and repetition rate or frequency of these pulses. To insure the correct operation of the receiver under virtually all conditions, the timing pulses are generated internally and the phase is adjusted to correspond with the phase of the transmitted pulses.

2. Description of the Prior Art

In a typical pulse recovery system, such as described in U.S. Pat. No. 2,980,858 entitled "Digital Synchronization Circuit Operating by Inserting Extra Pulses into or Delaying Pulses from Clock Pulse Train", the received pulses and the recovered pulses are compared in a coincidence gate with the overlapping portions of the pulses being applied directly to a second coincidence or AND gate and through an inverter to a third AND gate. Both the second and third AND gates have a pulse from a one shot multivibrator, which is triggered by the received pulse, applied thereto and the outputs are applied with internally generated clock pulses to an OR gate. The output pulses of one of the AND gates masks or reduces the number of internally generated clock pulses passing through the OR gate and the pulses of the other AND gate are differentiated and interspersed between the clock pulses to add to the number of pulses eminating from the OR gate. The pulses from the OR gate are utilized to produce the recovered pulses. Thus, whenever one of the recovered pulses is out of phase with a received pulse, additional pulses are added to shift the phase of the recovered pulse. Whenever noise or interfering signals are prevalent with the received pulses the interfering signals can appear in phase with the recovered pulses in the first coincidence gate to generate false signals and cause jittering in the recovered pulses. Further, this type of circuit will not operate when the received pulses and recovered pulses are 180° out of phase or when they are completely non-coincident.

SUMMARY OF THE INVENTION

The present invention pertains to a pulse recovery system wherein received and recovered pulses are applied to coincidence means with the output thereof being applied to integrator means, the output of which has an amplitude dependent upon the length of time the recovered and received pulses are non-coincident. The output of the integrator means is applied to a comparator means which produces an output signal when the amplitude of the output of the integrator means reaches a predetermined value. The output of the comparator means is differentiated to produce pulses, which pulses are interspersed between internally generated clock pulses in an OR gate and applied to a counter which produces the recovered pulses.

It is an object of the present invention to provide an improved pulse recovery system.

It is a further object of the present invention to provide a pulse recovery system which produces pulses that are relatively stable and insensitive to noise and other interfering signals.

It is a further object of the present invention to provide a pulse recovery system wherein a plurality of the received and recovered pulses must be non-coincidental before phase shifting signals are produced.

These and other objects of this invention will become apparent to those skilled in the art upon consideration of the accompanying specification, claims and drawings.

BRIEF DESCRIPTION OF THE DRAWINGS

Referring to the drawings:

FIG. 2 illustrates typical voltage verses time waveforms of the signals in various portions of the schematic of FIG. 1.

DESCRIPTION OF THE PREFERRED EMBODIMENT

Figure 1:
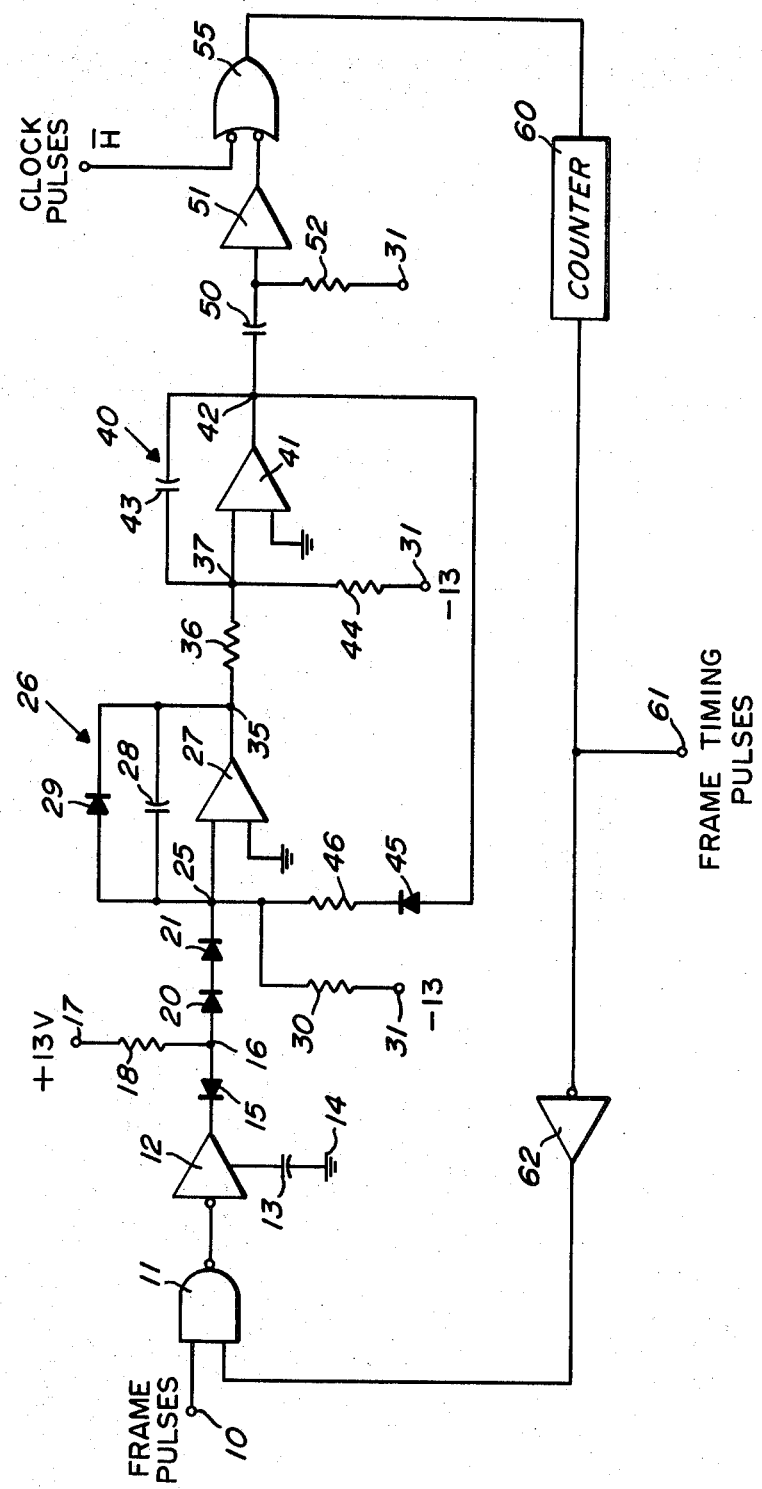
FIG. 1 is a schematic diagram of an embodiment of the present pulse recovery system.

Received pulses, pulses that are transmitted from a remote point relative to the receiver, are applied to a terminal 10 connected to a first input of coincidence means 11, which may be any of the well known means for indicating coincidence between a pair of signals. In the present embodiment the received pulses are positive pulses with a time between pulses of approximately five times the duration of a pulse (see FIG. 2a). The coincidence means 11 has a second input adapted to receive recovered pulses produced by the system as will be described. The operation of the coincidence means 11 in the present embodiment is such that a low level signal is produced at the output when the input pulses are in phase or coincidence and a high level signal is produced at all other times.

The output signal from the coincidence means 11 is applied to an inverter 12. The inverter 12, which is illustrated in block form, has one side of a capacitor 13 internally connected therein and the opposite side is connected to a common or ground 14. The output of the inverter 12 is applied to the cathode of a diode 15, the anode of which is connected to a junction 16. The junction 16 is also connected through a resistor 18 to a terminal 17 adapted to have a suitable positive voltage supply applied thereto. The anode of a pair of series connected diodes 20 and 21 is connected to the junction 16 and the free cathode is connected to a junction 25. The junction 25 serves as an input for integrating means, generally designated 26, which includes an operational amplifier 27 (illustrated in block form) with a feedback capacitor 28, connected between the output of the operational amplifier 27 and the junction 25, and a diode 29, having the cathode connected to the output of the operational amplifier 27 and the anode connected to the junction 25. The negative terminal of the operational amplifier 27 is connected to the junction 25, so that signals applied thereto are essentially reversed, and the positive terminal of the operational amplifier 27 is connected to ground 14. The junction 25 is further connected through a resistor 30 to a terminal 31 adapted to have a suitable negative supply voltage applied thereto. It should be understood that a variety of integrating means might be utilized but the disclosed means 26 are utilized because of simplicity and reliability.

The output of the integrating means 26, which appears on terminal 35, is applied through a resistor 36 to a terminal 37, which serves as the input of comparator or sensing means generally designated 40. The comparator means 40 includes a differential comparator 41, having a positive input lead connected to the junction 37 and a negative input lead grounded (so that the output thereof is not inverted) and an output connected to a junction 42. A feedback capacitor 43 is connected between the output junction 42 and the input junction 37 of the differential comparator 41. The input junction 37 is also connected through a resistor 44 to the terminal 31 adapted to have a suitable source of negative voltage applied thereto. The output terminal 42 of the comparator means 40 is connected to the anode of a diode 45 the cathode of which is connected through a resistor 46 to the input junction 25 of the integrating means 26. Thus, when the comparator means 40 provides an output signal, this positive going signal is fed back to the input of the integrating means 26. While a variety of comparing or sensing means might be utilized in place of the comparator means 40, the present circuitry is utilized because of the sensitivity and ability to vary the voltage required at the terminal 37 to provide an output signal at the terminal 42 (as will be apparent from the following explanation of the operation of the circuitry).

The output terminal 42 of the comparator means 40 is connected through a capacitor 50 to the input of an inverter 51. The input of the inverter 51 is also connected through a resistor 52 to the negative voltage terminal 31. The capacitor 50 and resistor 52 serve as a differentiating circuit to convert the output of the comparator means 40 to sharp positive going pulses which are inverted in the inverter 51 and applied to one input of OR means 55. A second input of the OR means 55 is connected to an input terminal 56 adapted to be connected to a source of internally generated clock pulses. In the present embodiment, the clock pulses are a continuous train of negative going pulses having a repetition rate approximately six times the repitition rate of the received pulses applied to terminal 10 (see FIG. 2d). It should be understood that the desired relationship between the clock pulses and the received pulses might be utilized and the present repetition rates are described only for exemplary purposes. Further, the OR means 55 which is illustrated is a simple OR gate (illustrated in block form) which provides a negative pulse at the output whenever a negative pulse is applied to either of the inputs (see FIG. 2e), but it should be understood that a variety of circuits might be utilized to add or intersperse the pulses provided at the output of the inverter 51 with the clock pulses applied to the terminal 56.

The negative going output pulses from the OR means 55 are applied to a counter and pulse producing means 60 which counts the number of pulses applied thereto and produces a negative going pulse of the desired width and amplitude for each predetermined number of input pulses, in the present embodiment six. The pulses from the counter and pulse producing means 60, which are the recovered pulses, are available at an output terminal 61 for use in timing circuits and the like in associated circuitry (not shown) and are also applied through an inverter 62 to the second input of the coincidence means 11, previously described. The counter and pulse producing means 60 may be any of a great variety of counting and/or binary circuits well known to those skilled in the art and should be constructed so that the circuits therein will be triggered by the pulses applied thereto to produce pulses at the output having the desired repetition rate, amplitude, width, and other characteristics.

The operation of the disclosed circuitry is as follows. When the received pulses and the recovered pulses applied to the coincidence means 11 are in phase, or coincident, a negative going pulse is applied to the input of the inverter 12. The negative going pulse appears as a positive going pulse on the cathode of the diode 15, which back biases the diode 15 so that a current flows from the positive source at terminal 17 through the resistor 18, diodes 20 and 21 and into the integrating means 26. The sizes of the various components are such that the current from the positive supply overcomes the current from the negative supply (at the terminal 31) and the output of the integrating means 26, at the terminal 35, is a negative voltage of approximately one diode drop (since the positive current flows through the diode 29) or approximately a −0.6 volts. The resistors 36 and 44 are selected to bias the junction 37 at approximately a −5.5 volts so that the −0.6 volts at the terminal 35 has no effect on the comparator means 40. Thus, as long as the pulses applied to the inputs of the coincidence means 11 are coincident or in phase, no output signals are produced in the comparator means 40. Therefore, no pulses are applied to the OR means 55 from the inverter 51 and only the clock pulses from the terminal 56 pass through the OR means 55 to the counter and pulse producing means 60.

When the recovered pulses are out of phase or non-coincident with the received pulses, as illustrated in the first three pulses of the waveforms in a and f of FIG. 2, the output of the coincidence means 11 is high and the output of the inverter 12 is low. The low signal at the output of the inverter 12 forward biases the diode 15 so that current from the positive supply at the terminal 17 flows through the resistor 18, diode 15 and inverter 12 to the common 14. The negative voltage supply at the terminal 31 then supplies current through the resistor 30 to the input terminal 25 of the integrating means 26 and the output terminal 35 begins to gradually rise as illustrated in the first portion of the waveform b in FIG. 2. If the pulses applied to the inputs of the coincidence means 11 remain out of coincidence for a sufficient period of time, the voltage at the terminal 35 reaches an amplitude sufficient to overcome the bias at the terminal 37 and a positive signal is applied to the comparator means 40 which produces a signal at the output terminal 42 thereof.

The positive signal on the terminal 42 is converted to a sharp positive pulse by operation of the capacitor 50 and resistor 52, which sharp positive pulse is inverted by inverter 51 and applied to an input of the OR means 55 where it is interposed between clock pulses. Simultaneously the positive signal on the terminal 42 is applied to the input of the integrating means 26 through the diode 45 and resistor 46 where it overcomes the current supplied by the negative supply at the terminal 31 to reverse operation of the integrating means 26 and cause the output thereof at terminal 35 to dip sharply negative.

The additional pulse interspersed between the clock pulses and applied to the counter and pulse producing means (as illustrated in e) will shift the recovered pulses, as illustrated by the fourth pulse in the waveform f of FIG. 2. If the pulses applied to the inputs of the coincidence means 11 are still not in coincidence, as illustrated in the next six pulses of waveform $f$, the current from the positive supply at the terminal 17 will still be shunted to ground through the resistor 18, diode 15 and capacitor 13. The positive signal at the terminal 42 of the comparator means 40 will be maintained until the capacitor 43 is sufficiently discharged to allow the terminal 37 to again go negative, at which time the positive signal will cease and the negative supply at terminal 31 will again take over and begin to raise the output terminal 35 of the integrating means 26 gradually positive. This procedure will continue, with a single pulse being applied to the OR means 55 for each complete cycle of the integrating means 26 and comparator means 40 until the recovered pulses are in coincidence with the received pulses (as illustrated by the last pulses in waveforms $a$ and $f$ of FIG. 2).

It should be noted that each complete cycle of the integrating means 26 and comparator means 40, which results in a single pulse being applied to the OR means 55, requires the application of a consecutive plurality of non-coincident pulses to the coincidence means 11. In the somewhat exaggerated waveforms illustrated in FIG. 2, only six non-coincident pulses are required to add a single pulse at the OR means 55 but in actual circuitry the time required for the output of the integrating means 26 to move from −0.6 volts to the predetermined voltage required to trigger the comparator means 40 may take as long as 1.5 seconds which, depending upon the repetition rate of the received pulses, may require as many as four or five hundred pulses to be non-coincident. The actual length of time required for the output signal of the integrating means 26 to reach the predetermined voltage required to trigger the comparator means 40 depends upon the cooperating circuitry to which the recovered pulses are applied and how long the non-coincident pulses can be sampled before this circuitry will be effected. It is of course understood that the more pulses considered when determining non-coincidence (the length of time required for the output voltage of the integrating means 26 to reach the predetermined voltage required to trigger the comparator means 40) the less effect noise and other interfering signals will have on the overall operation of the system. Thus, the components of the integrating means 26 are selected and a predetermined voltage is selected by the values of the components in the comparator means 40 so that an optimum (for the circuitry being utilized) number of non-coincident pulses at the input of the coincidence means 11 produce an additional pulse at the OR means 55.

Thus, a pulse recovery system is illustrated and described which is easily adjustable, depending upon the associated circuits, to continuously monitor the phase of internally generated recovered pulses relative to received pulses and to adjust the phase only in response to a plurality of pulses. The phase of a sufficient number of pulses is monitored to determine that the improper condition is not momentary, such as would be caused by noise or interfering signals. While specific phases and sizes of pulses have been disclosed, it should be understood that different sizes of pulses and/or different phases between pulses might be utilized by those skilled in the art with the inclusion of additional logic circuitry as is well known by those skilled in the art.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

We claim:

1. A pulse recovery system comprising:
   a. coincidence means providing an output in response to the phase relationship between first and second signals applied thereto;
   b. integrator means coupled to said coincidence means for receiving the output therefrom and providing an output in response thereto;
   c. comparator means coupled to said integrator means for receiving the output therefrom and providing an output when the output of said integrator means exceeds a predetermined level;
   d. OR means coupled to said comparator means for receiving the output therefrom and further coupled to receive a continuous train of pulses and providing output pulses in response to each of said output and train of pulses; and
   e. counting and pulse producing means coupled to said OR means for receiving the output pulses therefrom and providing an output pulse in response to each of a predetermined number of the output pulses applied thereto, the output pulses of said counting and pulse producing means being the second signal applied to said coincidence means.

2. A pulse recovery system comprising:
   a. input means for receiving transmitted pulses;
   b. coincidence means having two inputs and an output and providing a signal at the output in response to simultaneous signals on the two inputs, one of the inputs being coupled to said input means for receiving the transmitted pulses thereon;
   c. integrator means having an input and an output;
   d. means coupling the output of said coincidence means to the input of said integrator means for normally causing said integrator means to provide at the output thereof a signal gradually changing in amplitude and for reversing operation of said integrator means in response to a signal at the output of said coincidence means;
   e. comparator means having an input and an output and operative to provide a signal at the output in response to a signal of a predetermined amplitude at the input;
   f. means coupling the output of said integrator means to the input of said comparator means;
   g. pulse supply means for providing pulses at a repetition rate substantially at a predetermined multiple of the repetition rate of the transmitted pulses;
   h. OR means having two inputs and an output and providing a pulse at the output in response to a pulse applied to either of the inputs thereof, one of the inputs being coupled to the output of the comparator means and the other of the inputs being coupled to the pulse supply means;
   i. counter and pulse producing means coupled to the output of said OR means for receiving pulses therefrom and providing an output pulse in response to a predetermined number of received pulses, the output pulse from said counter and pulse producing means being coupled to the other of the inputs of said coincidence means.

3. A pulse recovery system as claimed in claim 2 including in addition feedback means coupled between the output of the comparator means and the input of the integrator means for applying a signal to the input to reverse operation of said integrator means in response to a signal being provided at the output of said comparator means.

4. A pulse recovery system as claimed in claim 2 including differentiating means interposed between the comparator means and the OR means for converting the output signal of the comparator means to pulses.

5. A pulse recovery system as claimed in claim 2 including means coupled to the integrator means for causing the output signal thereof to reach the predetermined amplitude required by the comparator means only when a consecutive plurality of pulses applied to the two inputs of the coincidence means are non-coincident.

* * * * *